(12) United States Patent
Daughtry et al.

(10) Patent No.: US 6,779,197 B1
(45) Date of Patent: Aug. 17, 2004

(54) REVERSE PATH UPSTREAM SIGNALING FOR STATUS MONITORING

(75) Inventors: Earl A. Daughtry, Lawrenceville, GA (US); Anthony T. Depoy, Dacula, GA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 943 days.

(21) Appl. No.: 09/607,442

(22) Filed: Jun. 30, 2000

Related U.S. Application Data

(60) Provisional application No. 60/142,290, filed on Jul. 2, 1999.

(51) Int. Cl.$^7$ .............................................. H04N 7/173
(52) U.S. Cl. ........................ 725/127; 725/107; 725/121
(58) Field of Search .......................... 725/32, 107, 121, 725/127, 149, 124, 125, 108, 118; 348/180, 192, 193; 330/2, 147; 379/90.1, 93.05, 93.06, 93.09; 455/232.1

(56) References Cited

U.S. PATENT DOCUMENTS

| | | | | | |
|---|---|---|---|---|---|
| 3,617,657 | A | * | 11/1971 | Brewer ........................ | 370/243 |
| 5,020,134 | A | * | 5/1991 | Pecaut ........................ | 455/67.7 |
| 5,874,992 | A | * | 2/1999 | Caporizzo ................... | 348/192 |
| 5,898,899 | A | * | 4/1999 | Ellis ............................ | 725/127 |
| 6,047,159 | A | * | 4/2000 | Powell et al. ................ | 725/105 |
| 6,091,441 | A | * | 7/2000 | Al-Araji et al. ............ | 455/3.02 |
| 6,160,452 | A | * | 12/2000 | Daughtry et al. ........... | 330/277 |
| 6,198,498 | B1 | * | 3/2001 | Brickell ...................... | 725/128 |
| 6,530,088 | B1 | * | 3/2003 | Brickell et al. ............. | 725/127 |

* cited by examiner

*Primary Examiner*—John Miller
*Assistant Examiner*—Scott Beliveau
(74) *Attorney, Agent, or Firm*—Fogg and Associates, LLC; David N. Fogg

(57) ABSTRACT

A reverse path signaling circuit is described which provides less noise and interruption when injecting signals upstream to a head end. The reverse path signaling circuit includes a low pass filter, a status monitor, and a common emitter amplifier. The common emitter amplifier has a emitter region which couples to the status monitor. The status monitor couples to the common emitter amplifier as a single-ended input to the to the emitter region. The status monitor injects status monitor signals into the emitter region for passing the status monitor signals upstream to a head end. The low pass filter is coupled to another input on the common emitter amplifier. An output from the common emitter amplifier is taken at a collector region. The reverse path signaling circuit of the present invention does not require the use of a directional coupler as part of the circuit. Systems and methods are further included within the scope of the present invention.

28 Claims, 4 Drawing Sheets

REVERSE PATH UPSTREAM SIGNALING FOR STATUS MONITORING

CROSS REFERENCE TO RELATED APPLICATIONS

This application is related to and claims the benefit of the filing date of co-pending provisional application Serial No. 60/142,290 (the '290 Application), filed on Jul. 2, 1999. The '290 Application is incorporated by reference.

TECHNICAL FIELD OF THE INVENTION

The present invention relates generally to the field of telecommunications and, in particular, to systems and methods for reverse path upstream signaling.

BACKGROUND

Cable networks are a common medium for providing video, audio and other data or programming to subscribers. Conventionally, cable networks have one or more head ends that transmit signals to subscribers over a medium that includes coaxial cable. Cable networks typically provide subscribers with programming on a variety of channels. Each channel occupies a distinct frequency band on the coaxial cable.

Signals transmitted over a coaxial cable tend to attenuate or decrease in signal strength or magnitude as the signals propagate away from the head end. Cable networks typically include network amplifiers that are placed at various locations in the cable network. The network amplifiers increase the magnitude of the signals to compensate for the attenuation due to the distance that the signals have propagated.

The attenuation in the magnitude of signals transmitted over coaxial cable further varies with the frequency of the signals. This is due to the "frequency response" of the coaxial cable. Significantly, the frequency response of a particular coaxial cable depends on the parameters in the construction of the coaxial cable such as, the characteristic impedance of the cable, the inner diameter of the outer conductor, the outer diameter of the inner conductor, the strand factor ($K_1$), the braid factor ($K_2$), the power factor, and the dielectric constant of the insulator of the cable among other parameters. Generally, however, the frequency response of a coaxial cable has a downward or negative slope with increasing attenuation as frequency increases. This is often referred to as "cable tilt" or "characteristic attenuation," e.g., the cable loss at a maximum frequency for the cable network subtracted from the cable loss at the minimum frequency for the cable network.

To compensate for cable tilt, as well as to detect other operating difficulties, network amplifiers often include status monitors. These status monitors are designed to provide signal alarms or other monitored condition reports back to the head end of the cable network. It is undesirable for status monitoring signals sent upstream to affect the mainline signal which is being transmitted downstream to the end user, or subscriber. The less intrusive status monitoring can be the better, especially from a cost standpoint and RF gain.

Conventionally, detecting operating difficulties involves using directional couplers at the network amplifier in the cable network. On downstream signaling, a directional coupler picks-off signals from the main signal path when data is requested by the head end. A response to the request is injected into the upstream signal via a second directional coupler. However, the presence of each directional coupler introduces an insertion loss, conventionally expressed in decibel (dB), into the downstream and upstream signal paths, respectively. An insertion loss, caused by a directional coupler, conventionally requires additional amplification in the corresponding signal path. Requiring additional amplification in the upstream signal path introduces additional noise. As a result RF gain is impacted which results in added cost to mitigate any loss in network performance.

For the reasons stated above, and for other reasons stated below which will become apparent to those skilled in the art upon reading and understanding the present specification, there is a need in the art for systems and methods for improved reverse path upstream signaling.

SUMMARY

The above mentioned problems with reverse path upstream signaling and other problems are addressed by the present invention and will be understood by reading and studying the following specification. A reverse path signaling circuit is described which provides less noise and interruption when injecting signals upstream to a head end.

In one embodiment, a reverse path signaling circuit is provided which includes a low pass filter, a status monitor, and a common emitter amplifier. The common emitter amplifier has a single-ended emitter injection region which couples to the status monitor. The status monitor injects status monitor signals into the single-ended emitter injection region for passing the status monitor signals upstream to a head end. The low pass filter is coupled to another input on the common emitter amplifier. An output from the common emitter amplifier is taken at a collector region. The reverse path signaling circuit of the present invention does not require the use of a directional coupler as part of the circuit.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
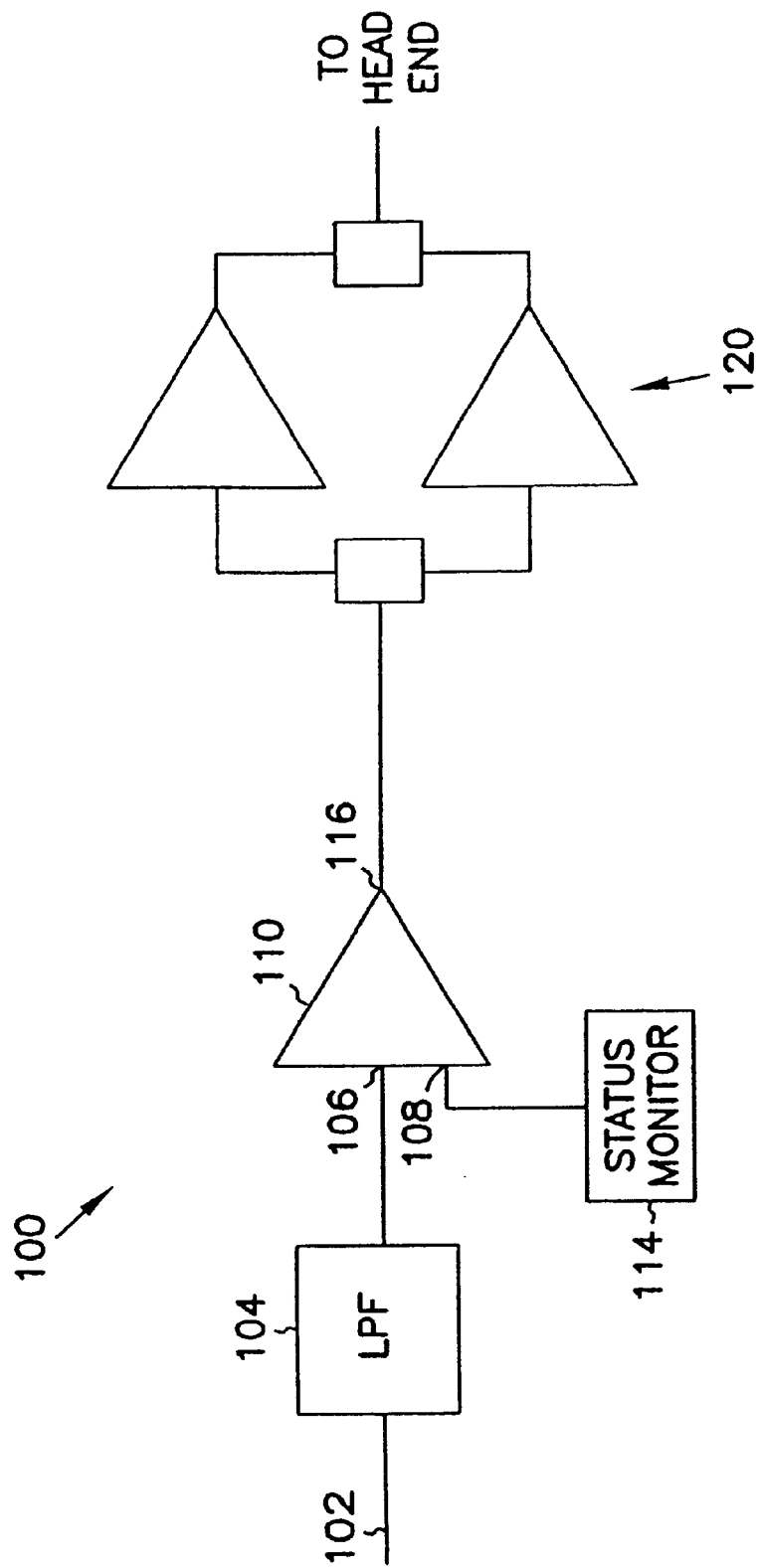
FIG. 1 is a diagram that illustrates a reverse path signaling circuit according to the teachings of the present invention.

FIG. 1 is a diagram that illustrates a reverse path signaling circuit 100 according to the teachings of the present invention. A reverse path signal, or upstream signal is introduced into the reverse path signaling circuit 100 at 102. A low pass filter (LPF) 104 receives the upstream signal. LPF 104 passes upstream signals in a selected frequency range. In one embodiment, the LPF 104 only allows upstream signals below 42 megaHertz (MH) to pass. In another embodiment, the LPF 104 passes signals between 5 and 15 MHZ. The LPF 104 couples to an input, or first input, 106 of a common emitter amplifier 110. A status monitor 114, included within a larger network amplifier portion of a cable system and discussed further below, is coupled to a single-ended emitter region 108 of the common emitter amplifier 110. In this manner, the status monitor 114 is able to provide status monitor signals into the upstream signal path via the common emitter amplifier 110 e.g., an alarm signal or a monitored condition status report signal. In one embodiment, the status monitor signals are injected into the single-ended emitter region 108 at a frequency range of 5 to 15 MHZ. Additionally, the status monitor signals can be injected into the single-ended emitter region 108 at a frequency range of 5 to 42 MHZ. And in one embodiment, the status monitor signals are injected into the single-ended emitter region 108 at a frequency range of above 15 and below 42 MHZ.

According to the teachings of the present invention the introduction of the status monitor signals into the single-ended emitter region 108 provides a solution to introducing noise or insertion loss into the reverse path upstream signaling circuit 100. In one embodiment, the single-ended emitter 108 portion of the common emitter amplifier has an input impedance of approximately 75 Ohms. Thus, status monitor 114 sees an input impedance which is appropriately matched to the line impedance. An output from the common emitter amplifier 110 which includes the upstream signal and a status monitor signal is provided at 116.

In operation an upstream signal is received from the upstream signal path 102 at the LPF 104. The LPF 104 couples an upstream signal under 42 MHZ to a first input 106 on the common emitter amplifier 110. Status monitor 114 couples an upstream status monitor signal into a second input 108 of the common emitter amplifier 110. According to the teachings of the present invention, the second input includes a single-ended emitter portion 108 of the common emitter amplifier 110. In one embodiment, the upstream status monitor signal includes an alarm signal to alert the head end of a problem. In another operational mode of the present invention, the status monitor 114 injects a monitored condition status report signal into the single-ended emitter portion of the common emitter amplifier 110 when a request signal, or trigger signal, is detected at a pick-off point (not shown) on a downstream signal path from the head end. An output signal from the common emitter amplifier 110 is taken at a collector region 116 of common emitter amplifier 110. The output signal from the common emitter amplifier 110 includes the upstream signal and the status monitor signal. The output signal is passed to a push-pull amplifier circuit 120. The output of the push-pull amplifier circuit 120 is then provided upstream to a head end (not shown).

Figure 2:
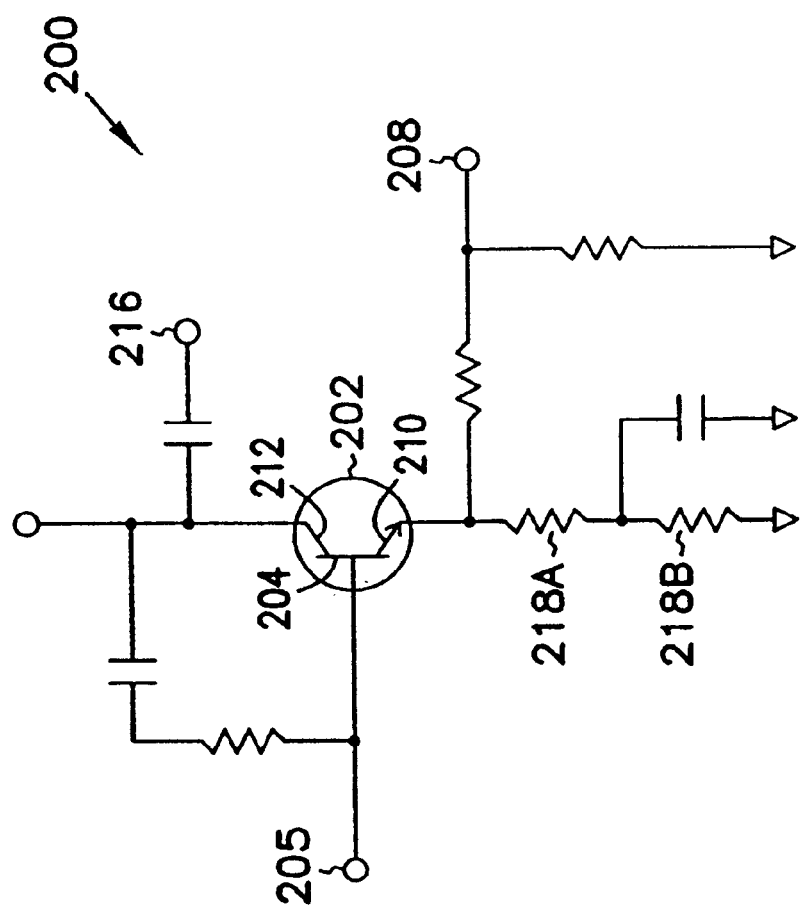
FIG. 2 is a schematic diagram illustrating a common emitter amplifier portion of the reverse path signaling circuit according to the teachings of the present invention.

FIG. 2 is a schematic diagram illustrating a common emitter amplifier 200 of a reverse path signaling circuit according to the teachings of the present invention. As shown in FIG. 2, an input to the common emitter amplifier is provided at 205 to receive the reverse path, upstream signal at the base 204 of transistor 202. The input impedance at the base is approximately 75 Ohms. Status monitor signals are provided to input 208 from a status monitor circuit such as status monitor 114 of FIG. 1. The reverse path upstream status monitor signals are injected as a single-ended input into emitter region 210 of the transistor 202. An output including the reverse path, upstream signal and the status monitor signals are taken from a collector region 212 of the transistor 202. The emitter region 210 of the common emitter amplifier 200 also has an input impedance of approximately 75 Ohms. In one embodiment, the common emitter amplifier 200 has approximately a unity gain. At 216 the output of the common emitter amplifier 202 is passed to a push-pull amplifier such as amplifier 120 of FIG. 1. In one embodiment, the input band for the common emitter amplifier 200 is in the frequency range of 5 to 15 megaHertz. In another embodiment, the input band for the common emitter amplifier 200 is in the frequency range of 15 to 42 megaHertz. As shown in FIG. 2, the emitter resistor of the common emitter amplifier 202 is split as emitter resistors 218A and 218B.

Figure 3:
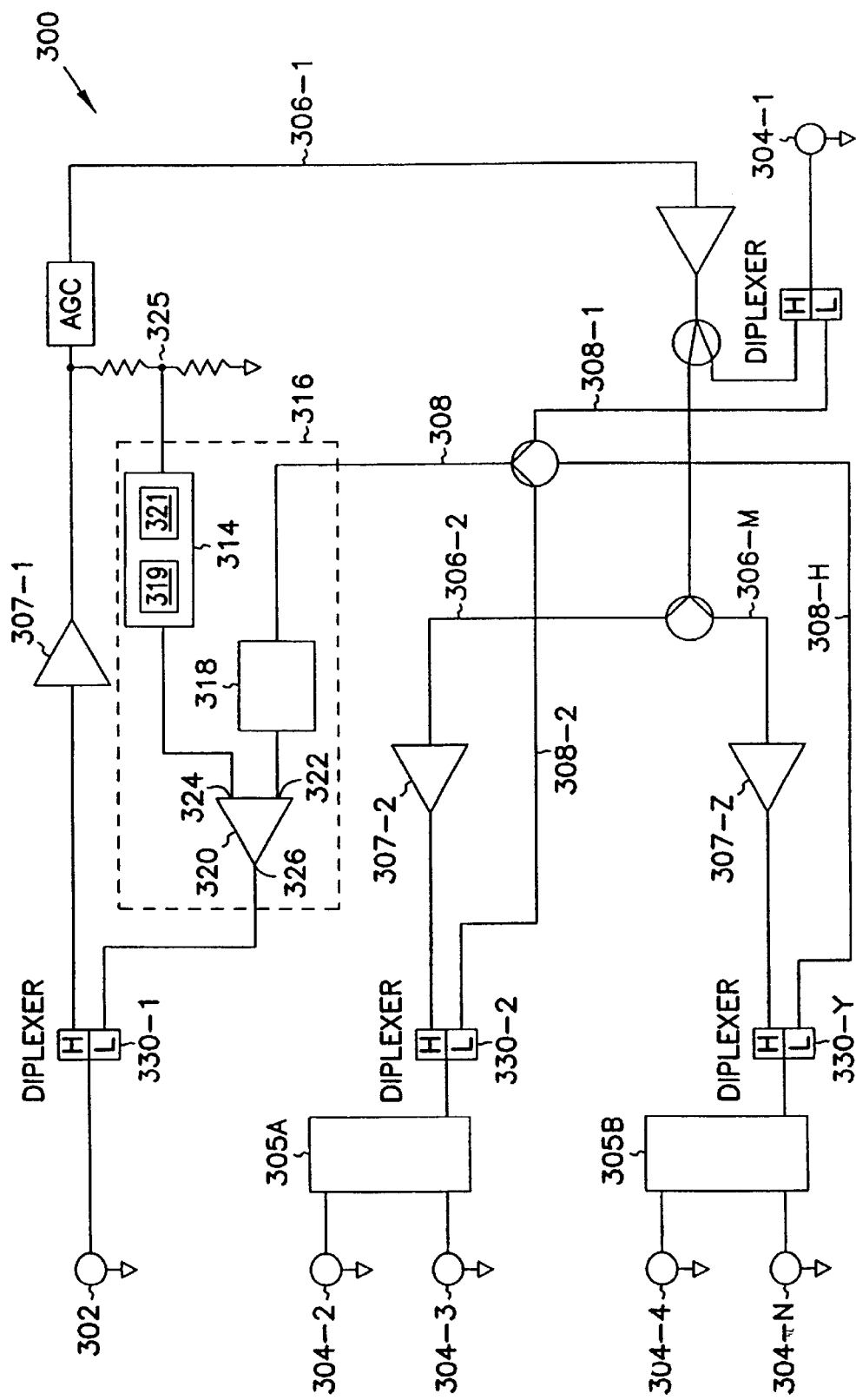
FIG. 3 is a block diagram of a network amplifier according to the teachings of the present invention.

FIG. 3 is a block diagram of a network amplifier 300 including a reverse path signaling circuit according to the teachings of the present invention. As shown in FIG. 3, network amplifier 300 includes downstream signal paths 306-1, 306-2, . . . , 306-M coupled between a head end port 302 and subscriber site ports 304-1, and 304-2, 304-3, 304-4, . . . 304-N, which can be selectively connected through switches 305A and 305B.

Network amplifier 300 also includes a number of amplifiers 307-1, 307-2, 307-Z, which are coupled in downstream signal paths 306-1, 306-2, . . . , 306-M. Amplifiers 307-1, 307-2, 307-Z amplify the signals transmitted on downstream signal paths 306-1, 306-2, . . . , 306-M to the subscribers. Diplexors 330-1, 330-2, . . . , 330-Y are included in the network amplifier 300 to pass only high frequency signals, e.g. above 42 mega-herze (MHz), along the downstream signal paths 306-1, 306-2, . . . , 306-M to the subscribers.

Network amplifier 300 further includes upstream signal paths, 308-1, 308-2, 308-H, that carry signals from subscribers to the head end port 302 back through diplexors 330-1, 330-2, . . . , 330-Y. Diplexors 330-1, 330-2, . . . , 330-Y pass only low frequency signals, e.g. below 42 mega-herze (MHz) along the upstream signal paths, 308-1, 308-2, 308-H, to the head end port 302. The upstream signals can include upstream signals sent to the head end 302 from subscribers connected to subscriber site ports 304-1, 304-2, 304-3, . . . , 304N. Likewise, the upstream signals can include upstream status monitor signals injected into the upstream signal path 308 by a status monitor 314.

According to the teachings of the present invention, a reverse path signaling circuit 316 is connected to the upstream path 308. The reverse path signaling circuit 316 includes the status monitor 314, a low pass filter 318, and a common emitter amplifier 320. The low pass filter, LPF, 318 couples an upstream signal to an input, or first input, 322 of the common emitter amplifier 320. In one embodiment, the low pass filter 318 allows upstream signals to pass in the 5 to 42 megaHertz frequency range. The status monitor 314 couples an upstream status monitor signal to a second input 324 of the common emitter amplifier 320. According to the teachings of the present invention, the second input includes a single-ended emitter input portion 324 of the common emitter amplifier 320. An output signal from the common emitter amplifier 320 is passed further along the upstream signal path from output region 326. In one embodiment, output region 326 includes a collector region 326 of common emitter amplifier 320. The output signal from the common emitter amplifier 320 includes the upstream signal and the upstream status monitor signal.

The status monitor 314 includes a transmitter 319 and a receiver 321. As shown in FIG. 3, the receiver 321 of the status monitor 314 is coupled at a pick-off point 325 to the downstream path 306-1. The pick-off point 325 detects status monitor request signals, or trigger signals carried on the downstream path 306-1. In one embodiment, the upstream status monitor signal transmits an alarm signal from the transmitter 319 to the second input 324 of the common emitter amplifier 320 when necessary to alert the head end of a problem. In another operational mode of the present invention, the status monitor 114 transmits a monitored condition status report signal from the transmitter 319 to the second input 324 of the common emitter amplifier 320 when a request signal, or trigger signal, is detected at a pick-off point 325 by receiver 321.

In one embodiment, the common emitter amplifier 320 with its single-ended emitter injection region 324 has an input impedance of approximately 75 Ohms. In one embodiment, the status monitor 314 couples status monitor signals to the single-ended emitter injection region 324 in the 5 to 42 megaHertz frequency range.

According to the teachings of the present invention, the common emitter amplifier 320 facilitates the transmission of upstream status monitor signals from the status monitor 314 to the head end port 302 without the use of a directional coupler. By eliminating the need for a directional couple, the novel reverse path signaling circuit 316 avoids the insertion loss traditionally introduced into the network amplifier 300 in the upstream signaling process by a directional coupler. As stated above, an insertion loss, caused by a directional coupler, conventionally requires additional amplification of an upstream signal in the reverse path signaling process. And, requiring additional amplification of the upstream signal introduces additional noise into the network amplifier 300 in the upstream signaling process. Thus the novel reverse path signaling circuit 316 of the present invention reduces the amount of noise traditionally introduced into the network amplifier 300 in the upstream signaling process.

Figure 4:
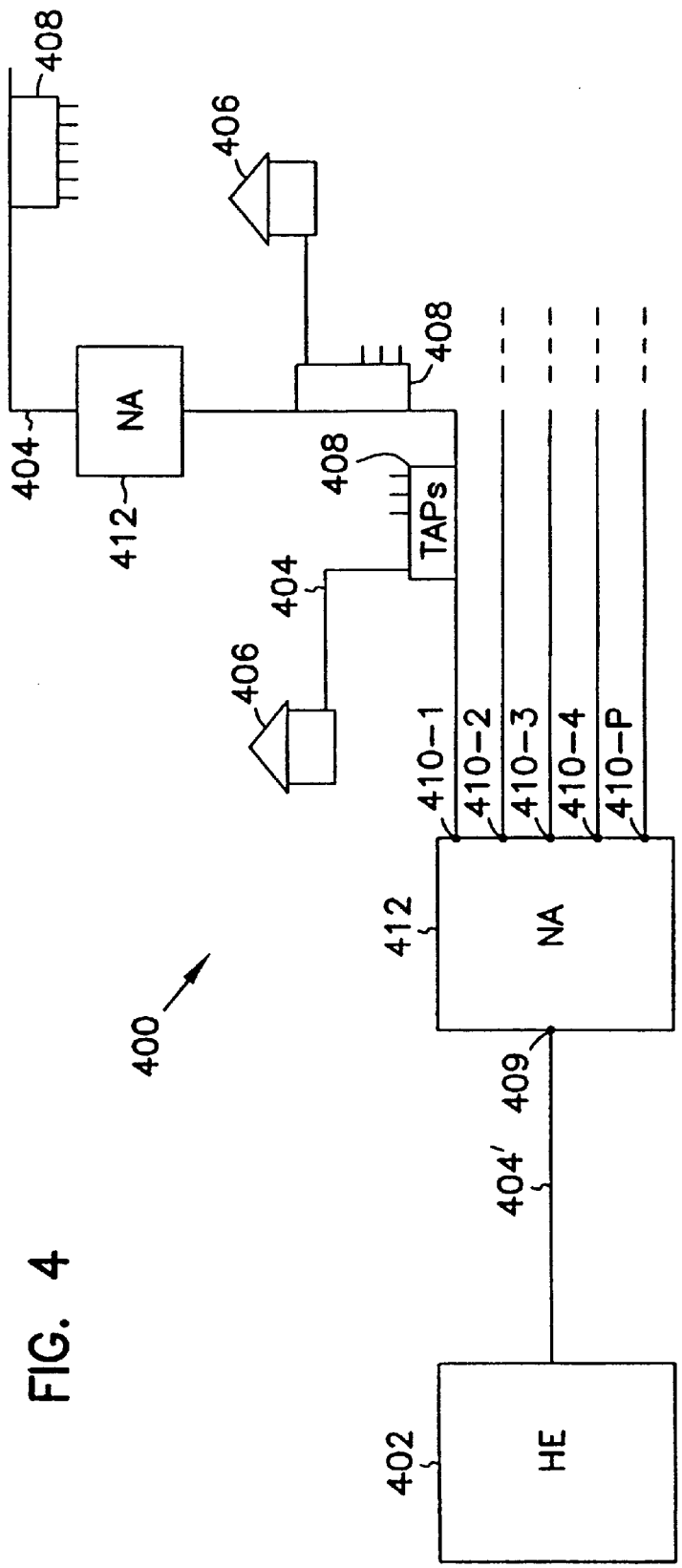
FIG. 4 is a block diagram illustrating a network amplifier as part of a cable system according to the teachings of the present invention.

FIG. 4 is a block diagram illustrating a network amplifier 412 as part of a cable system 400 according to the teachings of the present invention. As shown in FIG. 4, system 400 includes a network of coaxial cable portions, referenced collectively as 404. The network of cable portions 404 could include fiber portions 404' coupled via a splitter (not shown). The cable portions, or cable connections 404 pass programming signals between a head end 402 and subscribers or users, referenced collectively as 406. The cable portions 404 couple the subscribers 406 to the cable system 400 at cable taps, referenced collectively as 408. It is noted that head end 402 can provide video programming, telephony services, or other appropriated signals over system 400 to subscribers 406 connected to cable taps 408. The head end 402 is selectively coupled to cable taps 408 through at least one network amplifier (N/A) 412. In one embodiment, a number of network amplifiers 412, are dispersed throughout the region served by system 400. Network amplifiers 412 are selectively coupled into the cable system 400 to amplify the signals transmitted to the subscribers 406. The network amplifier 412 includes a network amplifier 412 having a reverse path signaling circuit as described and discussed in detail above in connection with FIG. 3. The head end couples to the network amplifier 412 at a head end port 409. The cable taps 408 coupled to the network amplifier 412 at a number of ports 410-1, 410-2, 410-3, 410-4, . . . 410-P.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

A reverse path signaling circuit has been described which avoids the insertion loss associated with a directional coupler and mitigates the need for additional upstream signal amplification. Thereby, less noise and interruption occurs when injecting signals upstream to a head end. Thus, the present invention, including the single-ended emitter injection to the common emitter amplifier provides a less intrusive method for passing status monitor signals to a head end of a cable system.

What is claimed is:

1. A reverse path signaling circuit comprising:
    a low pass filter;
    a status monitor; and
    a common emitter amplifier having an emitter region for coupling status monitor signals upstream to a head end, wherein the low pass filter couples to a first input on the common emitter amplifier, and wherein the status monitor couples to the common emitter amplifier as a single-ended input to the emitter region.

2. The circuit of claim 1, wherein an output of the common emitter amplifier further couples to a push-pull amplifier circuit.

3. The circuit of claim 2, wherein the output of the common emitter amplifier is taken from a collection region of the common emitter amplifier.

4. The circuit of claim 1, wherein the common emitter amplifier has an input impedance of approximately 75 Ohms at its emitter region.

5. The circuit of claim 1, wherein an emitter resistor for the common emitter amplifier is split.

6. The circuit of claim 1, wherein a transmitter on the status monitor couples status monitor signals as a single ended input to the emitter region in the 5 to 15 MHZ frequency range.

7. The circuit of claim 1, wherein a transmitter on the status monitor couples status monitor signals to the single-ended emitter injection region in the 15 to 42 megaHertz frequency range.

8. An amplifier circuit, comprising:
    a downstream signal path from a head end port to a user port;
    an upstream signal path from the user port to the head end port;
    a reverse path signaling circuit, including a status monitor, low pass filter, and common emitter amplifier, wherein the reverse path signaling circuit is coupled to the upstream signal path; and
    wherein the status monitor inputs status monitor signals into the common emitter amplifier of the reverse signaling path circuit using single-ended emitter injection for coupling status monitor signals upstream to the head end.

9. The amplifier circuit of claim 8, wherein the circuit further includes a number of switches which can selectively couple a transmission signal on the downstream signal path to a number of additional ports.

10. The amplifier circuit of claim 8, wherein the status monitor further includes a receiver coupled at a pick-off point to the downstream path.

11. The amplifier circuit of claim 10, wherein the status monitor further includes a transmitter coupled to an emitter region of the common emitter amplifier for coupling status monitor signals along the upstream path to the head end.

12. The amplifier circuit of claim 11, wherein the status monitor provides an alarm signal or a monitored condition status report signal into the common emitter amplifier whenever a trigger signal is detected at a pick-off point on the downstream path.

13. A cable system comprising:

at least one head end;

a network of coaxial cable portions that pass signals from the head end to a number of subscribers;

a number of network amplifiers dispersed throughout the region served by the cable system and selectively coupled into the network of coaxial cable to amplify the signals transmitted to the subscribers;

wherein at least one of the number of network amplifiers includes at least one downstream signal path for carrying signals to the number of subscribers and at least one upstream signal path for carrying signals to the head end, and wherein the upstream signal path further includes a reverse path signaling circuit comprising:

a low pass filter which receives signals from the at least one upstream signal path;

a status monitor; and a common emitter amplifier having an emitter region for coupling status monitor signals, from the status monitor, upstream to the head end, wherein the low pass filter couples to a first input to the common emitter amplifier, wherein the status monitor couples to the common emitter amplifier as a single-ended input to the emitter region, and wherein an output region of the common emitter amplifier further passes signals along the upstream signal path.

14. The cable system of claim 13, wherein the common emitter amplifier having single-ended emitter injection has an input impedance of approximately 75 Ohms.

15. The cable system of claim 13, wherein a transmitter on the status monitor couples status monitor signals to the emitter region in the 5 to 15 megaHertz frequency range.

16. The cable system of claim 13, wherein a transmitter on the status monitor couples status monitor signals to the emitter region in the 15 to 42 megaHertz frequency range.

17. The cable system of claim 13, wherein each network amplifier further includes a number of switches to pass signals from the at least one downstream signal path to a number of additional ports.

18. The cable system of claim 13, wherein the status monitor further includes a receiver coupled at a pick-off point on the downstream signal path.

19. The cable system of claim 13, wherein the status monitor further includes a transmitter coupled to single-ended emitter region of the common emitter amplifier for coupling status monitor signals along the upstream signal path to the head end.

20. The cable system of claim 13, wherein the status monitor provides an alarm signal or a monitored condition status report signal through the upstream signal path to the head end whenever such a signal is requested by request signals passed along the downstream path.

21. A method for upstream signaling, comprising:

receiving an upstream signal from a low pass filter into a common emitter amplifier;

injecting a status monitor signal from a status monitor into an emitter region on the common emitter amplifier; and taking an output from a collector region of the common emitter amplifier and passing the status monitor signal upstream to a head end.

22. The method of claim 21, wherein injecting a status monitor signal from a status monitor includes injecting a status monitor signal from a status monitor in a cable system.

23. The method of claim 21, wherein injecting a status monitor signal from a status monitor includes injecting a status monitor signal having a frequency in the 15 to 42 megaHertz range.

24. The method of claim 21, wherein the method further includes receiving a status monitor request signal from a downstream signal path at a pick-off receiver on the status monitor.

25. The method of claim 24, wherein injecting a status monitor signal from a status monitor includes injecting a status monitor signal whenever a status monitor request signal is received at the pick-off receiver from the downstream path.

26. The method of claim 21, wherein receiving the upstream signal from a low pass filter into a common emitter amplifier includes receiving the upstream signal from a low pass filter without the use of a directional coupler.

27. The method of claim 21, wherein taking an output from a collector region of the common emitter amplifier and passing the status monitor signal upstream to a head end includes coupling the output to a push-pull amplifier circuit.

28. The method of claim 21, wherein injecting a status monitor signal from a status monitor into a single-ended emitter region includes injecting the status monitor signal into a single-ended emitter region having an input impedance of approximately 75 Ohms.

* * * * *